F. J. LAPOINTE.
KEY SEAT BROACHING MACHINE.
APPLICATION FILED JUNE 10, 1912.

1,073,251.

Patented Sept. 16, 1913.

Witnesses:
N. C. Lombard
Edward H. Allen.

Inventor:
Francis J. Lapointe,
by Walter E. Lombard, Atty.

F. J. LAPOINTE.
KEY SEAT BROACHING MACHINE.
APPLICATION FILED JUNE 10, 1912.

1,073,251.

Patented Sept. 16, 1913.

Witnesses:
N. C. Lombard
Edward H. Allen

Inventor:
Francis J. Lapointe,
by Walter E. Lombard,
Atty.

F. J. LAPOINTE.
KEY SEAT BROACHING MACHINE.
APPLICATION FILED JUNE 10, 1912.

1,073,251.

Patented Sept. 16, 1913.

Witnesses:
N. C. Lombard
Edward F. Allen

Inventor:
Francis J. Lapointe,
by Walter E. Lombard,
Atty.

F. J. LAPOINTE.
KEY SEAT BROACHING MACHINE.
APPLICATION FILED JUNE 10, 1912.

1,073,251.

Patented Sept. 16, 1913.

Witnesses:
Nathan C. Lombard
Edward H. Allen

Inventor:
Francis J. Lapointe,
by Walter E. Lombard,
Atty.

UNITED STATES PATENT OFFICE.

FRANCIS J. LAPOINTE, OF HUDSON, MASSACHUSETTS, ASSIGNOR TO THE J. N. LAPOINTE CO., OF NEW LONDON, CONNECTICUT, A CORPORATION OF MAINE.

KEY-SEAT-BROACHING MACHINE.

1,073,251.  Specification of Letters Patent.  Patented Sept. 16, 1913.

Application filed June 10, 1912. Serial No. 703,094.

*To all whom it may concern:*

Be it known that I, FRANCIS J. LAPOINTE, a citizen of the United States of America, and a resident of Hudson, in the county of Middlesex and State of Massachusetts, have invented certain new and useful Improvements in Key-Seat-Broaching Machines, of which the following is a specification.

This invention relates to key seat broaching machines and has for its object the production of machines of this class of simple construction in which the working tool is operated at one speed and at the end of its movement automatically operates belt shifting mechanism to stop the machine, while provision is also made for the return of the working tool to its normal position at a faster speed.

The invention consists in providing the driving mechanism with a brake which is automatically applied thereto at the end of the movement of said working tool in either direction.

The invention further consists in providing the tool holder with a yielding buffer which actuates the belt shifting mechanism and the devices for applying the brake to the driving mechanism whereby said tool holder, without injury to the operating parts, is permitted to continue its movement slightly after the brake has been applied and the shifting mechanisms have been locked in their normal positions.

The invention consists further in certain novel features of construction and arrangement of parts which will be readily understood by reference to the description of the drawings and to the claims hereinafter given.

Of the drawings.

Similar characters designate like parts throughout the several figures of the drawings.

In the drawings, 10 represents a base provided with an extension 11, this extension 11 being supported at its outer end by means of a standard 12 secured to the base 10. At either end thereof are the brackets 13 and 13$^\times$ in which is revolubly mounted a shaft 14. Keyed to the shaft 14 are the pulleys 15 and 16 of different diameters, said pulleys being adapted to be made integral or separate as desired. Interposed between the pulley 16 and the bracket 13$^\times$ is loosely mounted upon the shaft 14 a pulley 17 of slightly less diameter than the said pulley 16, the latter having its outer edge slightly tapered to the periphery of the pulley 17. Secured to or forming a part of the base 10 is a vertical plate 18 to which is secured a casing member 19 having a bearing 20 for the revoluble shaft 14. Interposed between this bearing 20 and the pulley 15 is a loose pulley 21, the diameter of which is slightly less than that of the diameter of said pulley 15. The outer edge of the pulley 15 is slightly inclined to the periphery of the loose pulley 21. The belt 22 is adapted to normally drive the pulley 21 in one direction, while a cross belt 23 is adapted to normally drive the pulley 17 in the opposite direction. The hubs of both the pulleys 17 and 21 are provided with anti-friction members 24 which permit them to freely revolve upon the revoluble shaft 14. The casing member 19 is provided with a hub 25 in which is mounted a removable sleeve 26, the central bore of which is adapted to receive the hub 27 of a driving gear 28, this gear 28 having secured thereto by means of screws or other securing members another gear 29 of less diameter. Within the central bore of the hub 27 and keyed thereto is a nut 30 provided with a flange 31 through which bolts 32 extend threaded to the head 27 of the gear 28. Within the hub of the vertical plate 18 is mounted a removable sleeve 33 adapted to receive a tubular support 34 secured by screws to the gear 28. Interposed between the removable sleeve 33 and the flange upon the tubular member 34 are two grooved annular members 35 and 36, carrying antifriction members 37 in said groove.

Figure 4:
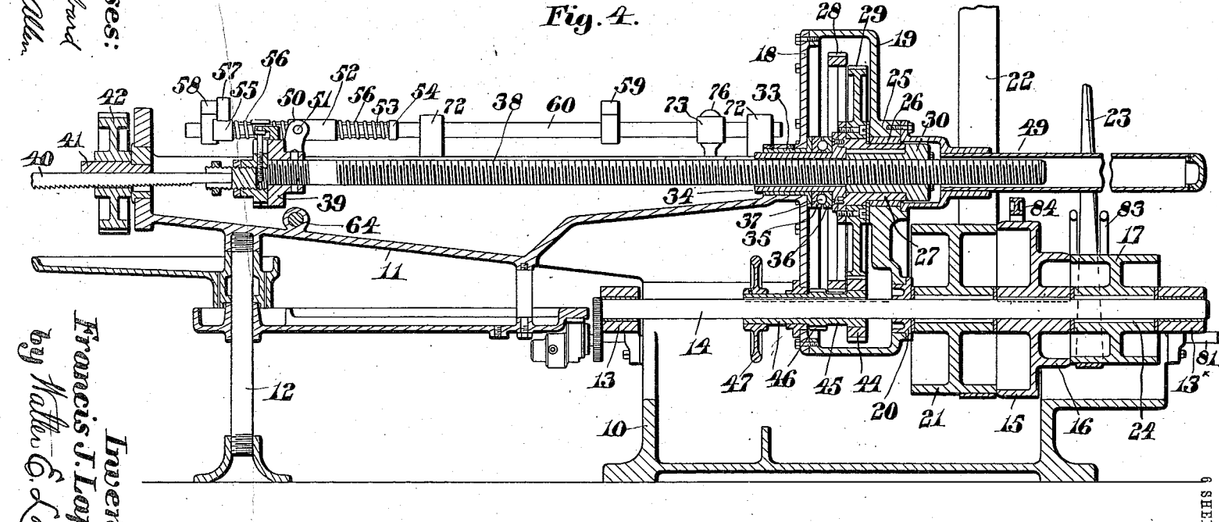
Fig. 4 represents a vertical longitudinal section of the same, the cutting plane being on line 4—4 on Fig. 1.
Figure 5:
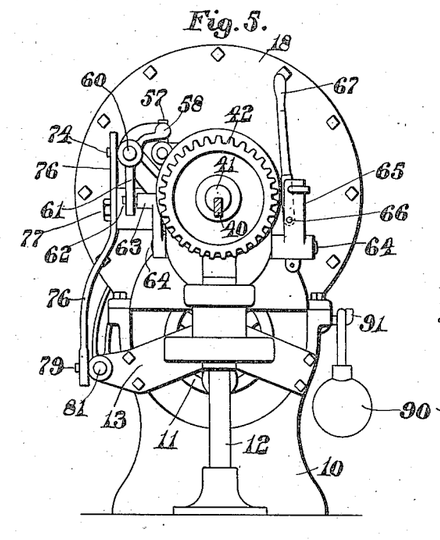
Fig. 5 represents a left hand elevation.
Figure 6:
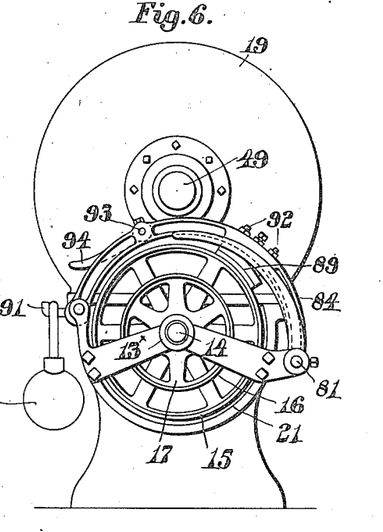
Fig. 6 represents a right hand elevation.
Figure 7:
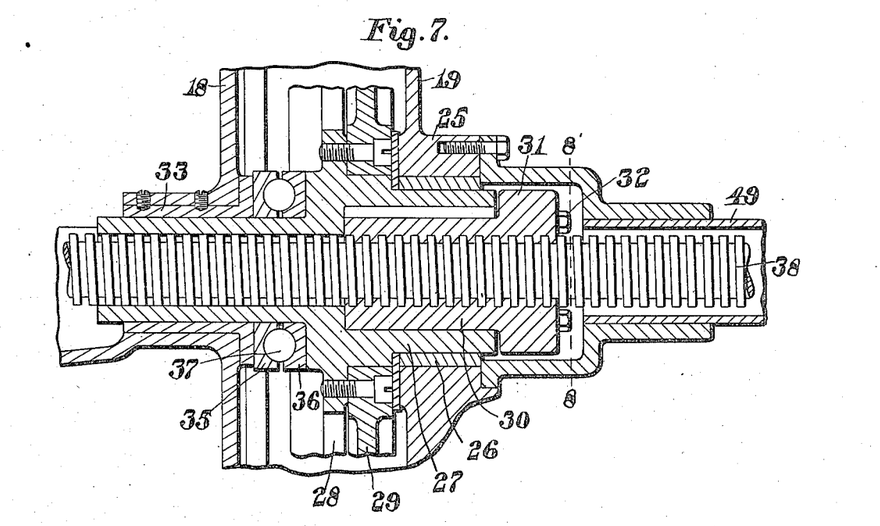
Fig. 7 represents an enlarged section through the screw operating devices.
Figure 8:
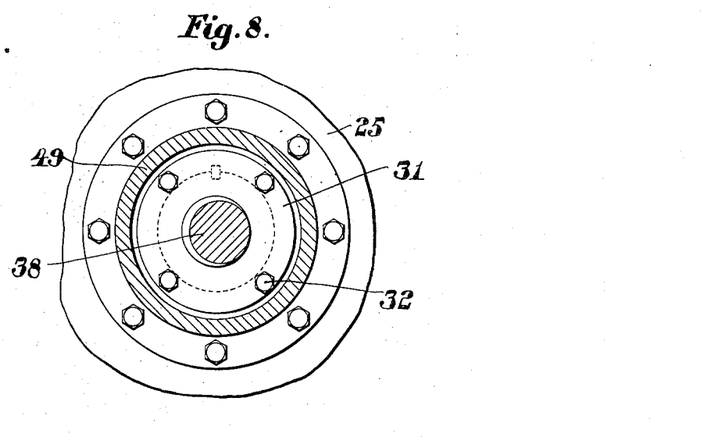
Fig. 8 represents a section through the same, the cutting plane being on line 8—8 on Fig. 7.

Threaded to the nut 30 is a screw 38 the opposite end of which has secured thereto a device 39 to which is clamped in any well-known manner a working tool 40. This tool 40 is adapted to reciprocate in a slot in the work support 41 on which is supported an article such as the gear 42 to be operated upon. The member 39 is adapted to be moved longitudinally on the guides 43 formed upon the inner walls of the extension 11 and the screw 38 is pinned to said member 39 to prevent its rotation. It is obvious that when the nut 30 is rotated in either direction by means of the gears 28—29 a reciprocation of the tool holder 38—39 will be effected. The gear 29 meshes with the pinion 44 secured to a sleeve 45 keyed to the revoluble shaft 14, and this sleeve 45 is provided with a pinion 46 adapted to mesh with the gear 28 when the pinion 44 is moved from mesh with the gear 29. The sleeve 45 is adapted to be moved endwise of the shaft 14 to bring either pinion 44 or 46 into mesh with its gear 29 or 28 by means of the handle 47 which may be reached by opening the door 48 in the front wall of the base 10. Secured to the head 25 of the casing 19 is a tubular member 49 forming a housing for the outer end of the screw 38 and protecting it from dust and other foreign substances which might be liable to interfere with the proper operation of the machine. The member 39 is provided with an upward extension 50 to which is secured at 51, a tubular member 52 having mounted therein a reciprocable rod 53 having enlarged heads 54 and 55 between which and the ends of said tubular member 52 are interposed springs 56. These springs 56 have the same tension and are adapted to keep the enlarged heads 54 and 55 equidistant from the ends of the tubular member 52 at all times in balanced position.

Figure 3:
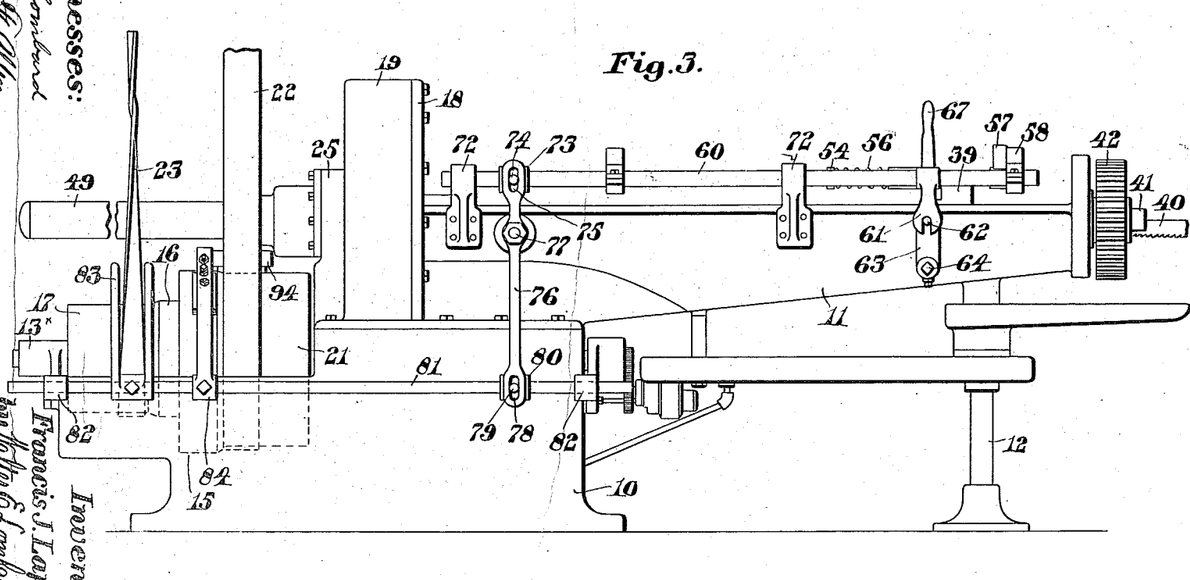
Fig. 3 represents a rear elevation of the same.
Figure 9:
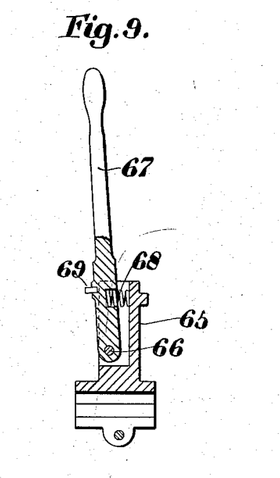
Fig. 9 represents a sectional detail of the handle for controlling the belt shifting and brake applying devices.
Figure 10:
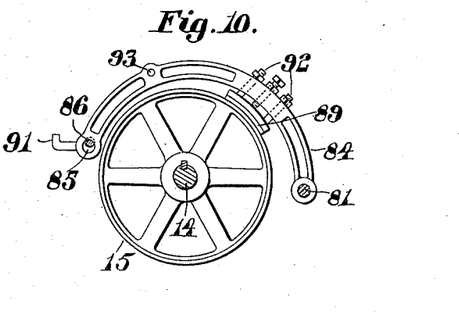
Fig. 10 represents a detail showing the brake arm and the manner of adjusting the brake shoe thereon.
Figure 11:
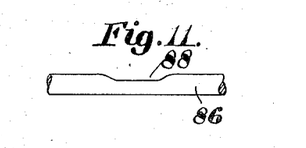
Fig. 11 represents an elevation of a portion of the cam rod for controlling the operation of the brake.

The head 55 is provided with an upwardly extending finger 57 in the same plane with the stop members 58 and 59 secured to a reciprocable rod 60 at the rear of the machine. Secured to the rod 60 is a downwardly extending forked member 61 engaging with a pin 62 upon an arm 63 secured to the oscillating shaft 64 having bearings in the extension 11. To the opposite end of this oscillating shaft 64 is secured an arm 65 having pivoted thereto at 66 a handle 67 pressed outwardly by means of a spring 68 as shown in Fig. 9 of the drawings. The handle 67 is provided with a projection 69 adapted to engage with a notch 70 (see Fig. 12) in a rib projecting from the front face of the extension 11. The rod 60 is mounted in bearings 72 secured to the rear of the extension 11 and near one end has secured thereto a collar 73 provided with a projection 74 extending into a slot 75 in a lever 76 pivoted at 77 to the extension 11 and having a slot 78 in its opposite end through which extends a projecting lug 79 on the collar 80 secured to a reciprocable rod 81 mounted in bearings 82 secured to the base 10. This rod 81 has secured thereto a forked member 83 adapted in the reciprocation of said rod to shift the cross belt 23 from its normal position as indicated in Fig. 3 to the opposite end of the loose pulley 17 or to the smaller fixed pulley 16. The rod 81 has also secured thereto a curved arm 84 normally extending over the pulley 15, said arm being provided at its opposite end with an opening 85 therethrough, through which extends a cam rod 86 supported at one end in a socket in the base 10 and at its opposite end in a bracket 87. Opposite the pulley 15 the rod 86 has a cam depression 88 therein. This arm 84 has secured thereto a brake shoe 89 the inner face of which is adapted to engage with the periphery of the fixed pulley 15. When the arm 84 is in the same plane with said pulley the depression 88 in the rod 86 will permit the weight 90 suspended from the hook 91 on the free end of said arm 84 to press the shoe 89 into firm contact with the pulley 15 to prevent its rotation when at rest and to stop its rotation when either driving belt is removed from one of the fixed pulleys. The shoe 89 is adjusted relative to the arm 84 by means of the threaded members 92. Intermediate its ends the arm 84 is provided with a lateral projection or pin 93 to which is secured the forked member 94 straddling the belt 22 and thereby providing a means for shifting the belt 22 from its normal position as indicated in the drawings either onto the fixed pulley 15 or to a new position upon the loose pulley 21.

Figures 1, 12:
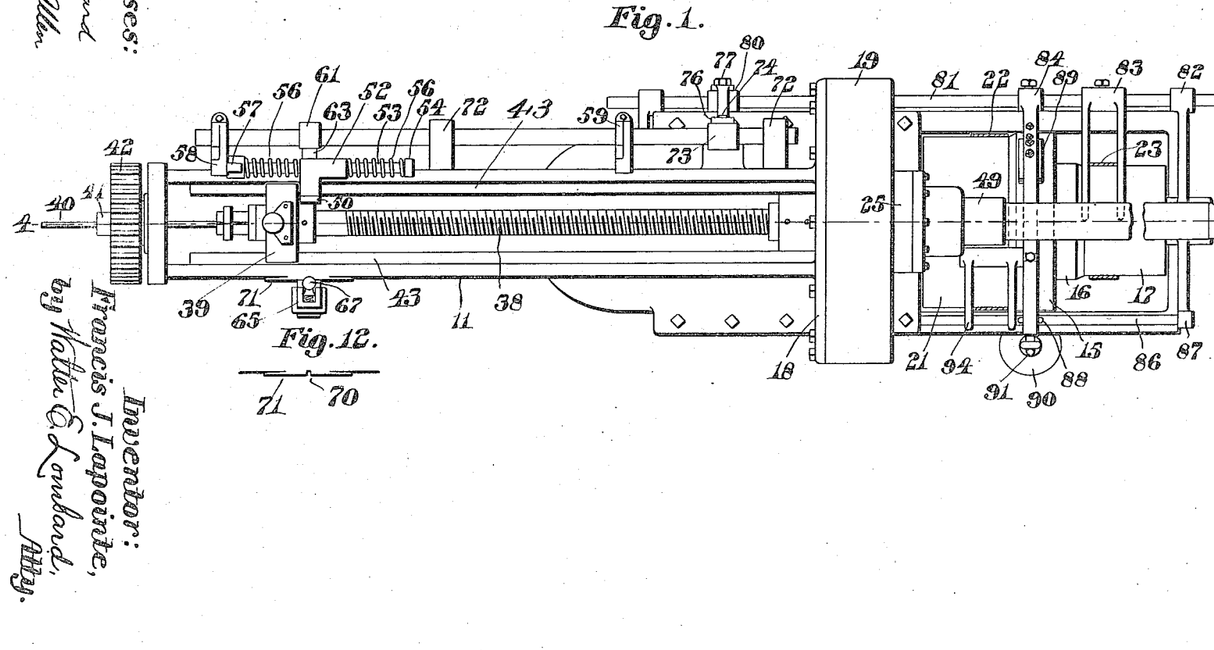
Figure 1 is a plan of a machine embodying the features of the present invention.
Fig. 12 represents a sectional detail of the notched segment with which the operating handle coacts.
Figure 2:
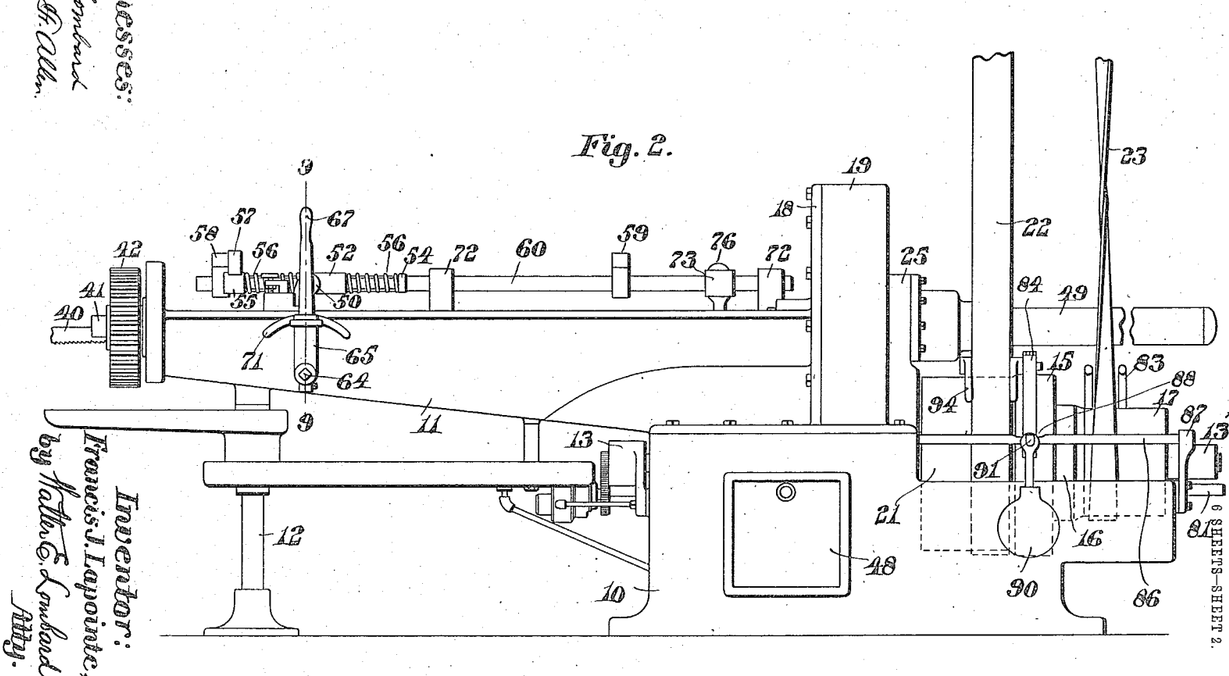
Fig. 2 represents a front elevation of the same.

Normally the various parts are in the positions shown in the drawing. When it is desired to operate upon a gear or other article to cut a key seat thereon, the gear 42 is placed upon the work support 41 and the working tool 40 extends through the radial slot in the work support, as is usual in other classes of broaching machines. The operator then seizes the handle 67 and moves it to the left of Fig. 2 of the drawings, thereby moving the rod 60 in the same direction and the rod 81 in the opposite direction. This movement of the rod 81 in the opposite direction or to the left of Fig. 3 of the drawings, will cause the brake arm 84 to be lifted as it rides along the rod 86 from the depression 88 onto the full diameter of said rod. The raising of the brake arm will remove the shoe 89 from contact with the periphery of the fixed pulley 15. While this movement is occurring, the belt 22 is simultaneously shifted from the loose pulley 21 onto the fixed pulley 15 and the shaft 14 is then rotated in a direction to cause, through the driving mechanism 44—29, such a rotation of the nut 30 as will move the screw 38 to the right of Fig. 4 of the drawings, thereby effecting an operation of the working tool. As the screw 38 approaches the end of its movement to the right, the arm 57 on the head 55 will come into contact with the stop member 59 and cause the rod 60 to move toward the right of Fig. 4 and the rod 81 to move in the opposite direction, this movement shifting the belt 22 back to its normal position upon the loose pulley 21 and bringing the brake arm 84 over the fixed pulley 15, thereby permitting the weight 90 to move said arm sufficiently about its pivot into the depressions 88 to cause the shoe 89 to firmly contact with the periphery of the fixed pulley 15 and prevent further rotation thereof. This movement of the rod 60 returns the handle 67 to its normal position, thereby permitting the pin 69 thereon to enter the notch 70 and lock the rod 60 from further reciprocating movement. The momentum, however, of the pulley 15, is liable to continue the rotation of the driving mechanism for a short time before the action of the brake can effect a complete stoppage thereof. As during this continued rotation the rods 60 and 81 are locked from further reciprocation by means of the pin 69 extending into the notch 70, injury would be done to the machine were it not for the balanced yielding member 53. The upwardly extending finger 57 having come in contact with the stop member 59 and moved it until locked by the handle 67. stops in this position and permits a further movement to the right of Fig. 4 of the tool holder against the tension of the right hand spring 53. This forms a very important feature of the invention. When it is desired to return the working tool to its normal position, the handle 67 is moved to the right of Fig. 2, thus moving the rod 60 and the stop members 58 and 59 to the right and the rod 81 to the left of said figure. This movement of the rod 81 will cause the cross belt 23 to be moved onto the smaller fixed pulley 16, and the brake arm 84 to be lifted as it moves from the depression 88, while at the same time the belt 22 is moved to the left hand end of the loose pulley 21, as shown in Fig. 1. The nut 30 will now be rotating in the opposite direction and cause the tool holder to be moved to the left of Fig. 4 at a faster speed. When the upwardly extending arm 57 reaches the stop member 58 it will move the rod 60 to its normal position as indicated in Fig. 4, and simultaneously the belts will be shifted and the brake shoe 89 moved into a position to prevent further rotation of the shaft 14. The yielding buffer 53, 54, 55 and 57 will operate in this movement in the same manner as has been described of the movement of the tool holder in the opposite direction.

When it is desired to change the speed of the entire machine for any particular purpose, the operator opens the door 48 and seizes the handle 47 and moves the sleeve 45 along the shaft 14 so that the pinion 44 will become disengaged from the gear 29 and the pinion 46 will mesh with the gear 28.

The housing 49 serves a useful purpose in protecting the end of the screw from dirt and other foreign substances which might injure it as it passes through the nut 30. At the same time it prevents the operator from coming in contact with the screw. When the nut 30 becomes worn this housing 49 can be removed and by removing the screws 32 the nut may be taken out and replaced by another without interfering in any manner with the driving mechanisms contained within the casing 19. Obviously this is of considerable advantage as it saves considerable time in making the necessary changes over constructions which have been in general use heretofore.

It is believed that the operation and many advantages of the invention will be thoroughly understood from the foregoing.

Having thus described my invention, I claim:

1. In a machine of the class described, the combination of a working tool; a reciprocating tool holder consisting in part of a nonrevoluble screw; a nut thereon; a revoluble shaft parallel with said screw; a pinion on said shaft; a gear on said nut meshing with said pinion; fast and loose pulleys on said shaft; and means coöperating with said pulleys for driving said shaft alternately in opposite directions.

2. In a machine of the class described, the combination of a working tool; a reciprocating tool holder consisting in part of a nonrevoluble screw; a nut thereon; a revoluble shaft parallel with said screw; a pinion on said shaft; a gear on said nut meshing with said pinion; two pulleys of different diameters keyed to said shaft; a loose pulley adjacent to each keyed pulley and having a periphery equal in width to the length of movement of said belts in either direction from their normal positions, said loose pulleys being adapted to be driven in opposite directions by two belts normally positioned thereon; and means for simultaneously moving said belts to bring one of them upon a keyed pulley.

3. In a machine of the class described, the combination of a working tool; a reciprocating tool holder consisting in part of a nonrevoluble screw; a nut thereon; a revoluble shaft parallel with said screw; a pinion on said shaft; a gear on said nut meshing with said pinion; two pulleys of different diameters keyed to said shaft; a loose pulley adjacent to each keyed pulley said loose pulleys having normally positioned thereon two belts movable in opposite directions; means for simultaneously moving said belts to bring one of them upon a keyed pulley; and a brake member normally engaging said large keyed pulley and movable from contact therefrom when either belt is moved into engagement with either of said keyed pulleys.

4. In a machine of the class described, the combination of a working tool; a reciprocating tool holder consisting in part of a nonrevoluble screw; a nut thereon; a revoluble shaft parallel with said screw; a pinion on said shaft; a gear on said nut meshing with said pinion; two pulleys of different diameters keyed to said shaft; a loose pulley adjacent to each keyed pulley said loose pulleys having normally positioned thereon two belts movable in opposite directions; devices for simultaneously shifting said belts to bring one of them upon a keyed pulley; a member movable with the belt shifting devices; a shoe carried thereby; and a weight for normally retaining said shoe in contact with the large keyed pulley.

5. In a machine of the class described, the combination of a working tool; a reciprocating tool holder consisting in part of a nonrevoluble screw; a nut thereon; a revoluble shaft parallel with said screw; a pinion on said shaft; a gear on said nut meshing with said pinion; two pulleys of different diameters keyed to said shaft; a loose pulley adjacent to each keyed pulley said loose pulleys having normally positioned thereon two belts movable in opposite directions; means for simultaneously moving said belts to bring one of them upon a keyed pulley; a member movable with the belt shifting devices; a shoe carried thereby; a weight for normally retaining said shoe in contact with the larger keyed pulley; and a fixed rod parallel with said shaft extending through an opening in said movable member and having a cam depression therein opposite said larger fixed pulley.

6. In a machine of the class described, the combination of a working tool; a reciprocating tool holder consisting in part of a nonrevoluble screw; a nut thereon; a revoluble shaft parallel with said screw; a pinion on said shaft; a gear on said nut meshing with said pinion; two pulleys of different diameters keyed to said shaft; a loose pulley adjacent to each keyed pulley said loose pulleys having normally positioned thereon two belts movable in opposite directions; means for simultaneously moving said belts to bring one of them upon a keyed pulley; a member movable with the belt shifting devices; a shoe carried thereby; a weight for normally retaining said shoe in contact with the larger keyed pulley; and means for adjusting said shoe relative to said movable member.

7. In a machine of the class described, the combination of a working tool; a reciprocating tool holder consisting in part of a nonrevoluble screw; a nut thereon; a revoluble shaft parallel with said screw; a pinion on said shaft; a gear on said nut meshing with said pinion; two fast pulleys and two loose pulleys on said shaft adapted to be driven by two belts movable in opposite directions said fast pulleys being interposed between said loose pulleys; a rod parallel with said shaft movable endwise; two belt shifting devices carried by said movable rod and adapted normally to retain said belts upon the loose pulleys; and means for moving said rod in either direction to shift one of said belts onto a fixed pulley and the other belt onto another portion of its loose pulley.

8. In a machine of the class described, the combination of a working tool; a reciprocating tool holder consisting in part of a nonrevoluble screw; a nut thereon; a revoluble shaft parallel with said screw; a pinion on said shaft; a gear on said nut meshing with said pinion; two fast pulleys and two loose pulleys on said shaft adapted to be driven by two belts movable in opposite directions, said fixed pulleys being interposed between the loose pulleys; a rod parallel with said shaft movable endwise; belt shifting devices carried by said movable rod and adapted normally to retain said belts upon the loose pulleys; means for moving said rod in either direction to shift one of said belts onto a fixed pulley and the other belt onto another portion of its loose pulley; and means controlled by the movement of said screw for moving said rod in the opposite direction for returning the belt on the fixed pulley to its loose pulley and the other belt to its original position.

9. In a machine of the class described, the combination of a working tool; a reciprocating tool holder consisting in part of a nonrevoluble screw; a nut thereon; a revoluble shaft parallel with said screw; a pinion on said shaft; a gear on said nut meshing with said pinion; fast and loose pulleys on said shaft adapted to be driven by two belts movable in opposite directions; a rod parallel with said shaft movable endwise; belt shifting devices carried by said movable rod and adapted normally to retain said belts upon the loose pulleys; means for moving said rod in either direction to shift one of said belts onto a fixed pulley; means controlled by the movement of said screw for moving said rod in the opposite direction for returning said belt to a loose pulley; and a brake carried by said movable rod normally engaging a fixed pulley.

10. In a machine of the class described, the combination of a working tool; a reciprocating tool holder consisting in part of a nonrevoluble screw; a nut thereon; a revoluble shaft parallel with said screw; a pinion on said shaft; a gear on said nut meshing with said pinion; fast and loose pulleys on said shaft adapted to be driven by two belts movable in opposite directions; a rod parallel with said shaft movable endwise; belt shifting devices carried by said movable rod and adapted normally to retain said belts upon the loose pulleys; means for moving said rod in either direction to shift one of said belts onto a fixed pulley; means controlled by the movement of said screw for moving said rod in the opposite direction for returning said belt to a loose pulley; a member secured to said movable rod and movable therewith, having an opening through its free end; a fixed rod extending through said opening and having a cam depression therein opposite the larger fixed pulley; a shoe on said member adapted to engage with the larger of said fixed pulleys; and a weight on the free end of said member.

11. In a machine of the class described, the combination of a working tool; a reciprocating tool holder consisting in part of a nonrevoluble screw; a nut thereon; a revoluble shaft parallel with said screw; a sleeve movable endwise on said shaft; two pinions on said sleeve of different diameters; gears on said nut adapted to mesh with said pinions; fast and loose pulleys on said shaft; means coöperating with said pulleys for driving said shaft alternately in opposite directions; and means for moving said sleeve to disengage one pinion from its gear and engage the other pinion with its gear.

12. In a machine of the class described, the combination of a working tool; a reciprocating tool holder consisting in part of a nonrevoluble screw; a nut thereon; a revoluble shaft parallel with said screw; two pinions on said shaft; gears on said nut of different diameters; means for moving either pinion into mesh with its gear and simultaneously disengage the other pinion from the gear; two pulleys of different diameters keyed to said shaft; a loose pulley adjacent to each keyed pulley said pulleys being adapted to be driven by two belts movable in opposite directions; and means for simultaneously moving said belts to bring either of them upon one of said keyed pulleys.

13. In a machine of the class described, the combination of a working tool; a reciprocating tool holder consisting in part of a nonrevoluble screw; a nut thereon; a revoluble shaft parallel with said screw; a pinion on said shaft; a gear on said nut meshing with said pinion; two pulleys of different diameters keyed to said shaft; a loose pulley adjacent to the outer face of each keyed pulley said pulleys being twice the width of said fixed pulleys and adapted to be driven by two belts movable in opposite directions; shifting mechanism for simultaneously moving said belts to bring either of them upon one of said keyed pulleys; a rod reciprocable in bearings; mechanism connecting said rod and shifting mechanism whereby the endwise movement of the former will cause said belt shifting mechanism to be moved in the opposite direction; and stop members on said rod adapted to be engaged by said tool holder at the end of its movement in either direction to effect the shifting of said belts.

14. In a machine of the class described, the combination of a working tool; a reciprocating tool holder consisting in part of a nonrevoluble screw; a nut thereon; a revoluble shaft parallel with said screw; a pinion on said shaft; a gear on said nut meshing with said pinion; two pulleys of different diameters keyed to said shaft; a loose pulley adjacent to each keyed pulley said pulleys being adapted to be driven by two belts movable in opposite directions; shifting mechanism for simultaneously moving said belts to bring either of them upon one of said keyed pulleys; a member movable with the belt shifting devices; a shoe carried thereby; a weight for normally retaining said shoe in contact with the large keyed pulley; a rod reciprocable in bearings; mechanism connecting said rod and shifting mechanism whereby the endwise movement of the former will cause said belt shifting mechanism to be moved in the opposite direction; and stop members on said rod adapted to be engaged by said tool holder at the end of its movement in either direction to effect the shifting of said belts.

15. In a machine of the class described, the combination of a working tool; a reciprocating tool holder consisting in part of a nonrevoluble screw; a nut thereon; a revoluble shaft parallel with said screw; a pinion on said shaft; a gear on said nut meshing with said pinion; two pulleys of different diameters keyed to said shaft; a loose pulley adjacent to each keyed pulley said pulleys being adapted to be driven by two belts movable in opposite directions; belt shifting mechanism therefor; a rod reciprocable in bearings; mechanism connecting said rod and shifting mechanism whereby the endwise movement of the former will cause an operation of the latter; stop members on said rod; and a yielding buffer carried by said tool holder adapted to engage a stop member in the movement thereof and effect an operation of said belt shifting devices.

16. In a machine of the class described, the combination of a working tool; a reciprocating tool holder consisting in part of a nonrevoluble screw; a nut thereon; a revoluble shaft parallel with said screw; a pinion on said shaft; a gear on said nut meshing with said pinion; two pulleys of different diameters keyed to said shaft; a loose pulley adjacent to each keyed pulley said pulleys being adapted to be driven by two belts movable in opposite directions; mechanism for simultaneously moving said belts to bring either of them upon one of said keyed pulleys; a reciprocable rod connected to said belt shifting devices and provided with lateral extensions; and a spring pressed rod mounted in a bearing in said tool holder and adapted to engage one of said extensions to effect a movement of the belt shifting devices.

17. In a machine of the class described, the combination of a working tool; a reciprocating tool holder consisting in part of a nonrevoluble screw; a nut thereon; a revoluble shaft parallel with said screw; a pinion on said shaft; a gear on said nut meshing with said pinion; two pulleys of different diameters keyed to said shaft; a loose pulley adjacent to each keyed pulley said pulleys being adapted to be driven by two belts movable in opposite directions; mechanism for simultaneously moving said belts to bring either of them upon one of said keyed pulleys; a reciprocable rod connected to said belt shifting devices and provided with lateral extensions; a rod freely movable in a bearing in said tool holder and provided with a shouldered head at each end; and a spring between each head and said bearing.

18. In a machine of the class described, the combination of a working tool; a reciprocating tool holder consisting in part of a nonrevoluble screw; a nut thereon; a revoluble shaft parallel with said screw; a pinion on said shaft; a gear on said nut meshing with said pinion; two pulleys of different diameters keyed to said shaft; a loose pulley adjacent to each keyed pulley said pulleys being adapted to be driven by two belts movable in opposite directions; mechanism for simultaneously moving said belts to bring either of them upon one of said keyed pulleys; a reciprocable rod connected to said belt shifting devices and provided with lateral extensions; a rod freely movable in a bearing in said tool holder and provided with a shouldered head at each end; a spring between each head and said bearing; and a projection on one of said heads adapted in the movement of said tool holder to engage said lateral extensions.

19. In a machine of the class described, the combination of a working tool; a reciprocating tool holder consisting in part of a nonrevoluble screw; a nut thereon; driving mechanism for said nut; a casing for said nut and driving mechanism; and a tubular member secured to said casing and forming a housing for the end of said screw.

20. In a machine of the class described, the combination of a working tool; a reciprocating tool holder consisting in part of a nonrevoluble screw; guides adapted to support one end of said screw; a fixed support; a nut removably secured to said support and surrounding said screw; driving mechanism keyed to said nut; and a removable sleeve in said support surrounding the hub of said driving mechanism.

21. In a machine of the class described, the combination of a casing having alined bearings; a removable sleeve in each bearing; a driving mechanism within said casing consisting in part of a gear having alined hubs revoluble in said sleeves and a central bore enlarged at one end; a nut positioned within the enlarged end of said bore and secured to said gear; a working tool; and a reciprocating tool holder consisting in part of a nonrevoluble screw threaded to said nut and extending through the central bore of said gear.

22. In a machine of the class described, the combination of a casing having alined bearings; a removable sleeve in each bearing; a driving mechanism within said casing consisting in part of a gear having alined hubs revoluble in said sleeves and a central bore enlarged at one end; a nut positioned within the enlarged end of said bore and secured to said gear; a working tool; two grooved annular members interposed between said gear and one of said removable sleeves; antifriction members in said grooves adapted to sustain the end thrust during the operation of said working tool; and a reciprocating tool holded consisting in part of a nonrevoluble screw threaded to said nut and extending through the central bore of said gear.

23. In a machine of the class described, the combination of a working tool; a tool holder consisting in part of a nonrevoluble screw; a nut thereon rotatable in either direction; mechanism for driving said nut; a rod reciprocable in bearings; means interposed between said rod and driving mechanism for causing the movement of the latter in either direction by the end movement of said rod; projecting members secured to said rod; a device for moving said rod in either direction to start said driving mechanism; means for locking said moving device in inoperative position; and a yielding member carried by said tool holder adapted to engage one of said projecting members and cause a movement of said rod to return said driving mechanism to a neutral position.

24. In a machine of the class described, the combination of a working tool; a tool holder consisting in part of a nonrevoluble screw; a nut thereon rotatable in either direction; mechanism for driving said nut; a rod reciprocable in bearings; means interposed between said rod and driving mechanism for causing the movement of the latter in either direction by the end movement of said rod; projecting members secured to said rod; a device for moving said rod in either direction to start said driving mechanism; means for locking said moving device in inoperative position; and a yielding balanced member carried by said tool holder adapted to engage one of said projecting members and cause a movement of said rod to return said driving mechanism to a neutral position.

Signed by me at 4 Post Office Sq., Boston, Mass., this 28th day of February, 1912.

FRANCIS J. LAPOINTE.

Witnesses:
WALTER E. LOMBARD,
NATHAN C. LOMBARD.